United States Patent
Bianchi et al.

(10) Patent No.: US 8,313,682 B2
(45) Date of Patent: Nov. 20, 2012

(54) METHOD OF MANUFACTURING A FOAM

(75) Inventors: Matteo Bianchi, Bristol (GB); Fabrizio Scarpa, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/900,822

(22) Filed: Oct. 8, 2010

(65) Prior Publication Data

US 2011/0109005 A1 May 12, 2011

(30) Foreign Application Priority Data

Nov. 6, 2009 (GB) .................... 0919416.8

(51) Int. Cl.
*B29C 33/58* (2006.01)
*B29C 67/20* (2006.01)

(52) U.S. Cl. ........................ 264/316; 264/321

(58) Field of Classification Search ............ 264/321
See application file for complete search history.

(56) References Cited

U.S. PATENT DOCUMENTS

| 3,025,200 A | 3/1962 | Powers |
| 4,209,480 A * | 6/1980 | Homsy ............ 264/108 |
| 4,668,557 A | 5/1987 | Lakes |
| 2006/0208135 A1* | 9/2006 | Liguore et al. ....... 244/117 R |

FOREIGN PATENT DOCUMENTS

| DE | 195 05 523 A1 | 8/1996 |
| JP | A-2004-059872 | 2/2004 |
| WO | WO 99/25530 | 5/1999 |
| WO | WO 2007/052054 A1 | 5/2007 |

OTHER PUBLICATIONS

Alderson et al., "How to make auxetic fibre reinforced composites", Phys. Stat. Sol (b) 242, No. 3, 509-518 (2005).*
Martz et al., "Re-entrant Transformation Methods in Closed Cell Foams", Retrieved from: [http://silver.neep.wisc.edu/{lakes/PoissonClosedCell.pdf]. Adapted from *Cellular Polymers*, 1996, pp. 229-249, vol. 15, University of Wisconsin, United States.
Search Report issued in corresponding European Application No. 10 18 6874 dated Feb. 17, 2011.
Search Report issued in British Patent Application No. 0919416.8, dated Feb. 23, 2010.

* cited by examiner

*Primary Examiner* — Christina Johnson
*Assistant Examiner* — Benjamin Schiffman
(74) *Attorney, Agent, or Firm* — Oliff & Berridge, PLC

(57) ABSTRACT

A method of manufacturing a foam having a negative Poisson's ratio comprising the steps: placing a pad 12 of open cell polyurethane foam on a moulding surface 4; placing a flexible membrane 18 over the exposed surface of the foam to create a sealed chamber 20 between the moulding surface 4 and the flexible membrane 18 in which the foam pad 12 is disposed; applying an isostatic pressure difference between the inside and the outside of the chamber 20 thereby collapsing the foam pad 12 between the flexible membrane 18 and the moulding surface 4; heating the foam pad 12 to a predetermined temperature, and subsequently cooling the foam pad 12 while collapsed.

13 Claims, 1 Drawing Sheet

METHOD OF MANUFACTURING A FOAM

This invention relates to a method of manufacturing a foam having a negative Poisson's ratio, and is particularly, although not exclusively, concerned with manufacturing a foam having a negative Poisson's ratio from an open cell foam made of polymeric material.

Materials having a negative Poisson's ratio, when stretched, become thicker in a direction which is perpendicular to the applied force. This behaviour is a consequence of hinge-like structures within the material which flex when stretched. Materials which display a negative Poisson's ratio are often referred to as "auxetic" materials.

It is known that an auxetic material can be manufactured from open cell foams such as open-cell polyurethane foam. Open-cell foams are foams in which the cells are not closed, but communicate with one another through openings in the cell walls. The cells can be considered to be defined by ribs rather than walls such that the cells create a network of interconnected pores within the foam.

WO9925530 describes a method of manufacturing an auxetic foam in which a piece of low density open-cell polyurethane foam is first placed within a mould. The mould comprises sets of opposing plates which are moved towards each other to compress the foam in three orthogonal directions. Compression of the foam causes the ribs of the cells to buckle. The foam is then heated under compression to a plastic or semi-plastic state which causes the ribs to become permanently deformed. The foam is subsequently cooled to set the ribs in their deformed state thereby creating a foam in which the cells have a re-entrant structure. It is this re-entrant structure which provides the hinge-like structures that give rise to a foam having a negative Poisson's ratio.

Similar methods are disclosed by U.S. Pat. No. 4,668,557, U.S. Pat. No. 3,025,200 and WO2007052054. In each case the foam is pressed between plates along one or more axes before being heated to soften the foam. The foam is subsequently cooled to set the re-entrant structure described above. A characteristic of these methods is that the foams produced display auxetic properties in the directions in which they were compressed.

Compression of the outer surface of the foam using plates creates an uneven stress distribution across the foam. In particular, higher stresses in the vicinity of the plates results in greater compression of the cells closest to the plates than the cells away from the plates. As a consequence, these methods produce foams having a non-uniform Poisson's ratio.

In addition, methods which rely on mechanical compression between plates require lubricant between the plates and the foam in order to prevent the foam from sticking to the plates which would otherwise lead to non-uniform compression.

According to the present invention there is provided a method of manufacturing a foam having a negative Poisson's ratio comprising the steps:
(a) placing an open cell foam on a moulding surface;
(b) placing a flexible membrane over the exposed surface of the foam to create a sealed chamber between the moulding surface and the flexible membrane, with the foam disposed within the chamber;
(c) applying an isostatic pressure difference between the inside and the outside of the chamber thereby collapsing the foam between the membrane and the moulding surface;
(d) heating the foam to a predetermined temperature; and
(e) subsequently cooling the foam while collapsed.

In step (c), the pressure difference may be applied by reducing the pressure within the chamber between the moulding surface and the flexible membrane.

The open cell foam may be an amorphous solid or a non-crystalline solid, and for example may be made from polymeric material.

The predetermined temperature may be greater than the glass transition temperature of the foam and lower than the melting temperature of the foam, and for example may be not less than 120° C. and not more than 170° C.

Step (d) may be performed in an oven, which may be an autoclave.

In step (e) the foam may cooled to a temperature below the glass transition temperature of the foam.

The cooling may be performed by immersing the foam in water, or alternatively by allowing the foam to cool in air at room temperature.

The membrane may be provided by a bag into which the mould and the foam are placed, and the pressure difference is applied by evacuating the bag, for example to a pressure below 0.7 bar (70 kPa).

For a better understanding of the present invention, and to show more clearly how it may be carried into effect, reference will now be made, by way of example, to the accompanying drawings, in which:—

Figure 1:
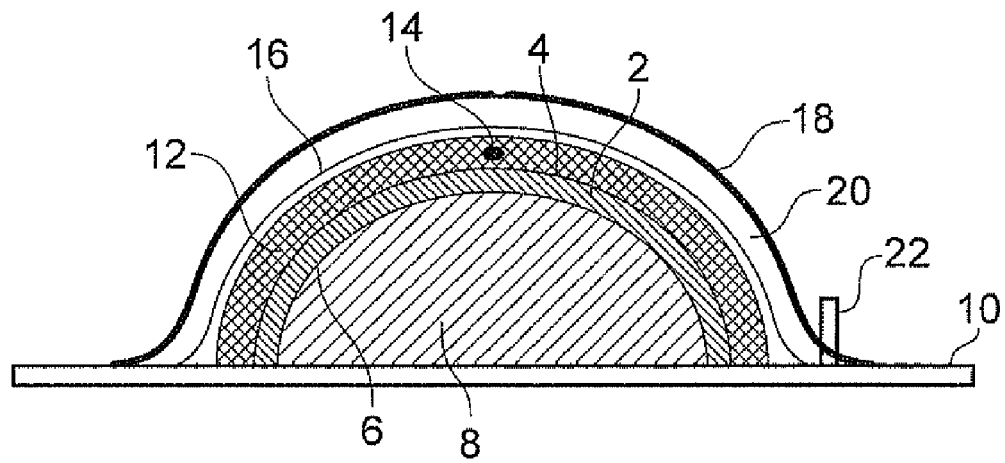
FIG. 1 shows part of the apparatus used to carry out the invention following completion of steps (a) and (b).

FIG. 1 shows an open mould 2 having a semi-cylindrical shape having a convex moulding surface 4 and a concave inner surface 6. The mould 2 is formed from an iron plate.

A release film (not shown) is first laid over the moulding surface 4. The edges of the release film are folded over the edges of the mould 2 and secured to the inner surface 6 using tape. This ensures correct positioning of the release film. The mould 2 is then packed with a filler 8 such as rigid foam. The filler 8 is shaped so that it follows the curvature of the inner surface 6, thus minimising gaps between the filler 8 and the inner surface 6. A blanket (not shown) may also be provided between the filler 8 and the inner surface 6 to further minimise gaps. The purpose of the filler 8 and the blanket is described below.

The packed mould 2 is placed onto a tooling plate 10 with the inner surface 6 facing the tooling plate 10. The filler 8 is disposed between the mould 2 and the tooling plate 10. The tooling plate 10 is, in this instance, a rigid aluminium plate.

A flat open cell foam pad 12, such as open cell polyurethane foam, is placed on the moulding surface 4. The foam pad 2 substantially covers the moulding surface 4, but does not overhang the edges of the mould 2. The foam pad 12 has a thickness which is substantially less than its length and width measured transversely of the thickness.

A temperature sensor 14, such as a thermocouple, is inserted into the core of the foam pad 12 and connected to a suitable measuring device. The temperature sensor 14 is positioned so that it measures the internal temperature of the foam pad 12. The position of the temperature sensor 14 with respect to the tooling plate 10 may be fixed using temperature resistant tape to secure part of the sensor 14, including its leads, to the tooling plate 10.

The surfaces of the foam pad 12 not in contact with the mould 2 are covered with a release film (not shown). A breather blanket 16 is laid over the release film and covers the foam pad 12, mould 2 and filler 8 arrangement.

A flexible membrane 18 is placed over the assembled mould 2, filler 8, foam pad 12 and breather blanket 16 and sealed to the tooling plate 10 about the periphery of the mould 2. The flexible membrane 18 may be sealed to the tooling plate 10 using double sided tape. The flexible membrane 18 and the tooling plate 10 thus form an air-tight chamber 20 which surrounds the mould 2, filler 8, foam pad 12 and breather blanket 16. The flexible membrane 18 may be provided by a vacuum bag, part of a vacuum bag or similar provided that the flexible membrane 18 is capable of maintaining a pressure difference across it and is sufficiently flexible to follow the shape of the foam pad 12. It will be appreciated that the mould 2, filler 8, foam pad 12, breather blanket 16 and tooling plate 10 could be placed entirely within a vacuum bag.

A vacuum nozzle 22 is inserted through the flexible membrane 18 into the chamber 20. The vacuum nozzle 22 is connected to a vacuum pump (not shown).

The chamber 20 is evacuated through the vacuum nozzle 22 to a technical vacuum, i.e. a pressure not greater than 0.7 bar (70 kPa) thereby applying an isostatic pressure difference between the inside and the outside of the chamber 20. The flexible membrane 18 is thus drawn towards the mould 2 and squeezes the foam pad 12 against the moulding surface 4. Evacuation of the chamber 20 reduces the pressure within the cells of the foam pad 12 thus causing the cells to collapse. Compression of the cells, and hence deformation of the ribs of the cells, is therefore highly uniform across the thickness of the foam pad 12. This results in a substantially homogenous re-entrant structure throughout the foam pad 12. It will be appreciated that the pressure in the chamber 20 may be varied in accordance with the amount of compression desired.

Figure 2:
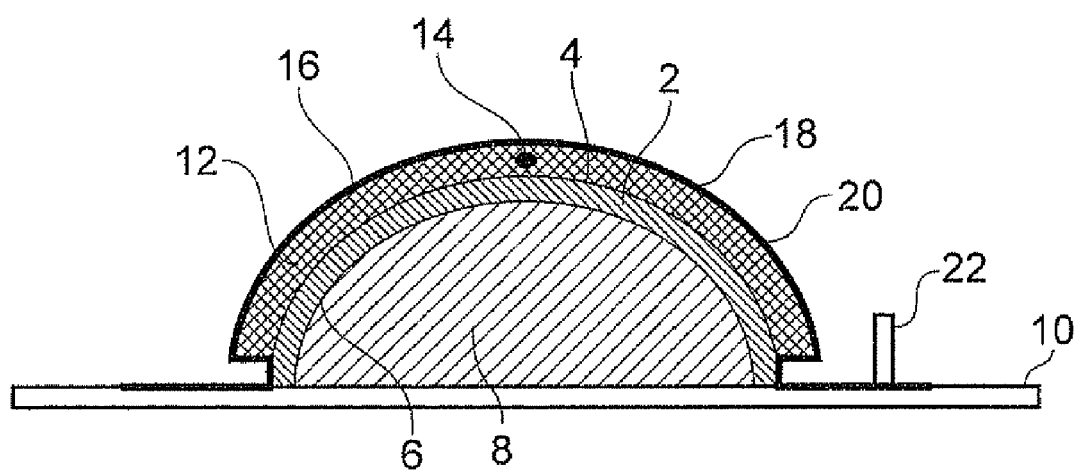
FIG. 2 shows part of the apparatus used to carry out the invention following completion of step (c).

Although not shown in FIG. 2, it will be appreciated that the foam pad 12 is collapsed along is length and its width and will thus contract over the moulding surface 4. The foam pad 12 is not secured to the moulding surface 4 which allows the surface of the foam pad 12 to slide over moulding surface 4 as it is squeezed and so accommodate small displacements of the foam relative to the moulding surface 4.

The filler 8, and blanket if used, prevents the flexible membrane 18 from squeezing inside the mould 2 when the isostatic pressure difference is applied, and also reduces the volume to be evacuated.

The assembly, comprising the mould 2, filler 8, tooling plate 10, collapsed foam pad 12 and breather blanket 16, is placed in an autoclave at 200° C. and 1 bar. The foam pad 12 is removed from the autoclave when the internal temperature of the foam pad 12, which is monitored by the temperature sensor 14, reaches 135° C. It will be appreciated that the temperature to which the foam pad 12 is heated exceeds the glass transition temperature of the foam material. Consequently, when the foam pad 12 reaches a temperature of 135° C., the foam pad 12 softens and becomes permanently deformed. In general, this temperature is reached after the foam pad 12 has been in the autoclave at 200° C. for up to 30 minutes.

The pressure difference between the inside and outside of the chamber 20 is kept constant throughout the heating process, i.e. the vacuum in the chamber 20 is maintained.

The assembly is then removed form the autoclave and submersed, whilst collapsed with the vacuum maintained, in water. The sealed chamber 20 keeps the foam pad 12 dry. The temperature of the water is below the glass transition temperature of the foam material. However, it will be appreciated that since the foam pad 12 has been permanently deformed, it is not necessary to maintain the pressure difference between the inside and the outside of the chamber 20 during the cooling process. The foam pad 12 can, therefore, be removed from the chamber 20 following heating and subsequently cooled.

The foam produced is auxetic having a homogenous distribution of mechanical properties. It is anticipated that such a foam will have particular application for sound proof panels, acoustic lining such as duct liners and vibration mat pads.

It should be recognised that the invention is not limited to polymeric foams, but may, for example be applied to other types of foams such as metallic foams.

It will be appreciated that the invention is not limited to semi-cylindrically shaped open moulds. Open moulds having different shaped moulding surfaces, including textured, contoured, double curvature or flat surfaces may be used. In particular, it is anticipated that the method may be used to manufacture auxetic foam sheets or panels of large area, for example, greater than 1 m². In addition, the invention may be used to create triangular, trapezoidal or sinusoidal wave shaped foam pads having a negative Poisson's ratio from a flat pad of open-cell foam.

It will be appreciated that the chamber 20 may be formed by sealing the flexible membrane 18 to the mould 2, in particular, the moulding surface 4. Alternative configurations are also possible provided that evacuation of the chamber 20 causes the flexible membrane 18 to squeeze the foam against the moulding surface 4.

In a variant of the method, the foam pad 12 is heated before the isostatic pressure difference is applied. The ribs of the cells are thus softened before the cells are collapsed. As with the embodiment described above, the foam pad 12 is cooled after the pressure difference has been applied to collapse the cells of the foam pad 12. It will be understood, however, that the pressure difference need only be applied to collapse the foam pad 12 and need not be maintained during the cooling process.

The invention claimed is:

1. A method of manufacturing a foam having a negative Poisson's ratio having the steps:
    (a) placing an open cell foam on a moulding surface;
    (b) placing a flexible membrane over the exposed surface of the foam to create a sealed chamber between the moulding surface and the flexible membrane, with the foam disposed within the chamber;
    (c) applying an isostatic pressure difference between the inside and the outside of the chamber thereby collapsing the foam between the membrane and the moulding surface;
    (d) heating the foam to a predetermined temperature; and
    (e) subsequently cooling the foam while collapsed.

2. The method according to claim 1, in which in step (c) the pressure difference is applied by reducing the pressure within the chamber between the moulding surface and the flexible membrane.

3. The method according to claim 1, wherein the open cell foam is an amorphous solid or a non-crystalline solid.

4. The method according to claim 3, in which the predetermined temperature is greater than the glass transition temperature of the foam and lower than the melting temperature of the foam.

5. The method according to claim 3, in which the foam is made from polymeric material.

6. The method according to claim 5, in which the predetermined temperature is not less than 120°C. and not more than 170°C.

7. The method according to claim 3, in which in step (e) the foam is cooled to a temperature below the glass transition temperature of the foam.

8. The method according to claim 1, in which step (d) is performed in an oven.

9. The method according to claim 8, in which the oven is an autoclave.

10. The method according to claim 1, in which in step (e) cooling is performed by immersing the foam in water.

11. The method according to claim 1, in which in step (e) cooling is performed by allowing the foam to cool in air at room temperature.

12. The method according to claim 1, in which the membrane is provided by a bag into which the mould and the foam are placed, and the pressure difference is applied by evacuating the bag.

13. The method according to claim 12, in which the pressure in the bag is reduced below 0.7 bar.

* * * * *